(12) United States Patent  
Fortuna

(10) Patent No.: US 6,944,932 B2  
(45) Date of Patent: Sep. 20, 2005

(54) METHOD FOR MAKING A SELF-LOCKING KNOT IN A STATOR LACING MACHINE

(76) Inventor: Giovanni Fortuna, Via Juvarra 7, 10098 Rivoli (Torino) (IT)

( * ) Notice: Subject to any disclaimer, the term of this patent is extended or adjusted under 35 U.S.C. 154(b) by 472 days.

(21) Appl. No.: 10/091,981

(22) Filed: Mar. 6, 2002

(65) Prior Publication Data

US 2003/0167624 A1 Sep. 11, 2003

(51) Int. Cl.⁷ .................... H02K 15/00; H02K 15/14; H02K 15/16
(52) U.S. Cl. .................... 29/596; 29/564.5; 29/606; 29/717; 29/732; 29/735; 112/470.23; 140/101
(58) Field of Search .................... 29/596, 564.5, 29/606, 717, 732, 735; 112/470.23; 140/101

(56) References Cited

U.S. PATENT DOCUMENTS

| 3,862,493 A | * | 1/1975 | Habegger et al. | 112/470.23 |
| 3,983,826 A | * | 10/1976 | Dunn | 112/475.08 |
| 4,558,894 A | | 12/1985 | Detterbeck et al. | |
| 4,563,962 A | | 1/1986 | Muskulus | |
| 4,614,161 A | * | 9/1986 | Frederick | 112/470.23 |

FOREIGN PATENT DOCUMENTS

| JP | 02214445 | 8/1990 |
| JP | 06276710 | 9/1994 |

* cited by examiner

*Primary Examiner*—Carl J. Arbes  
*Assistant Examiner*—Tim Phan  
(74) *Attorney, Agent, or Firm*—Greenberg Traurig LLP; Eugene C. Rzucidlo

(57) ABSTRACT

A method and a corresponding apparatus provide for both the automatic lacing of a toroidal coil of a stator of a dynamo-electric machine, and the knotting of the end lacing terminal of the lacing cord, by using the same needle and the same thread-guide tube. The apparatus for lacing and knotting comprises an automatic control system that, accomplished the whole lacing operation on the coil, stops the rotation movement of the stator and drives the lacing needle according to a sequence of movements in order to form a plurality of linked rings closed one on the other for obtaining a closing chain on said end lacing terminal. A particular cutting system allows not generating scrap, i.e. undesired cord portions, accelerating the production process and increasing the system reliability.

16 Claims, 11 Drawing Sheets

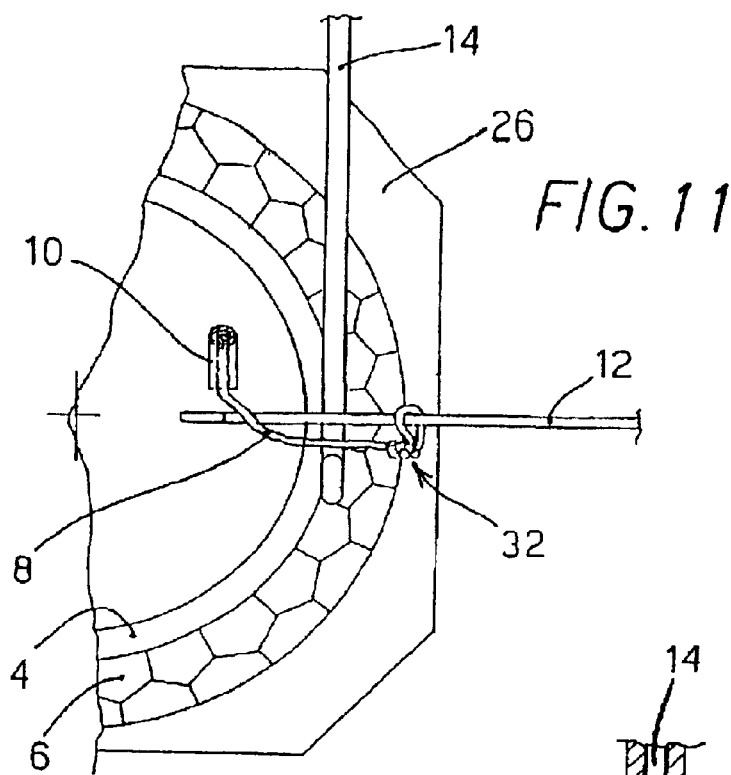
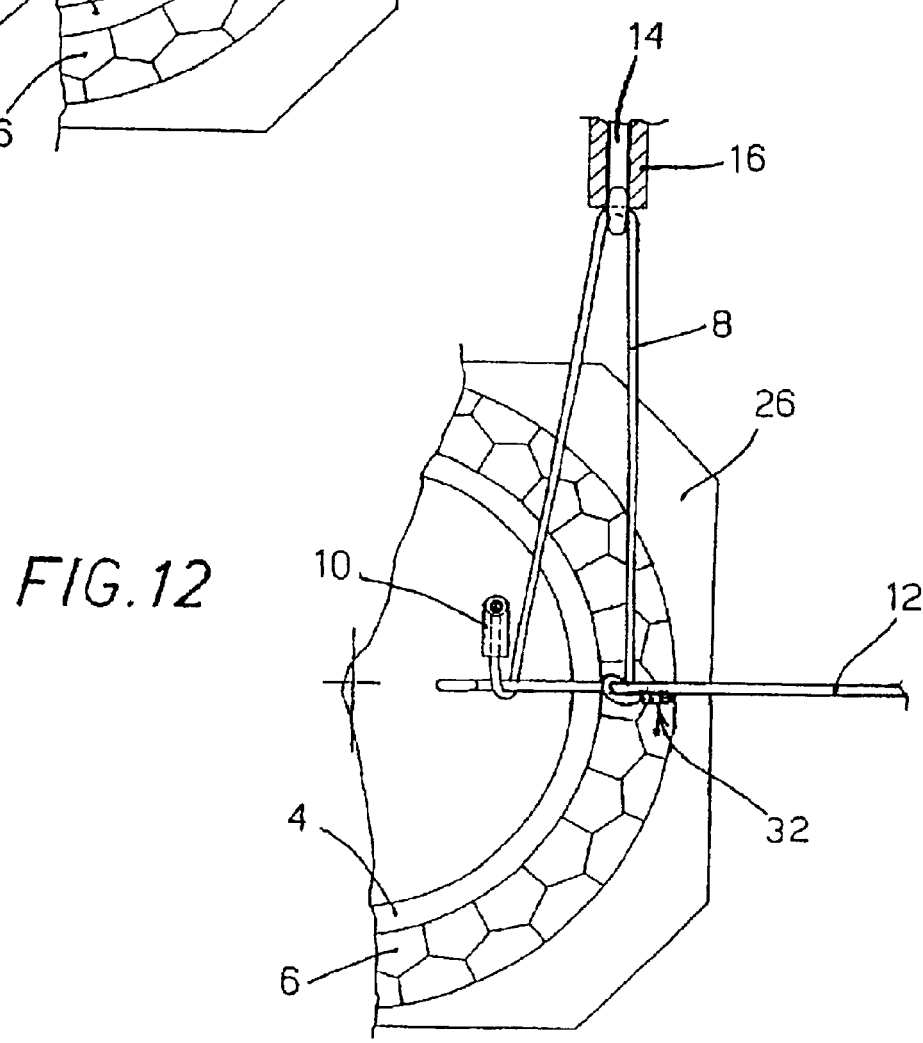

METHOD FOR MAKING A SELF-LOCKING KNOT IN A STATOR LACING MACHINE

FIELD OF THE INVENTION

The present invention refers to a method and an apparatus for lacing and knotting, by means of a cord, coils or windings of dynamo-electric machines, for example stator coils of electric motors.

More particularly the invention refers to an apparatus and a relative method for automatically making a knot on the end lacing terminal of the cord.

BACKGROUND OF THE INVENTION

The stators of many dynamo-electric machines, for example motors and electric generators, comprise a toroidal metal core and a plurality of copper or aluminum wire windings, passing through the core, suitable for generating a magnetic field necessary for the operation of the machine. For improving the machine efficiency and for avoiding that a winding wire interferes with the rotor, the windings are generally wrapped, in particular the parts that project out of the core, by means of a cotton or synthetic material cord, for example polyester.

In order to effect the lacing of the stators in an automatic way, suitable automatic lacing stations have been developed. For instance U.S. Pat. No. 3,685,470 describes a machine for the lacing of stators that effects a type of lacing known as "diamond stitch" or "honeycomb." Using this machine however, when the lacing is finished, the operator must manually knot the initial and final terminals of the cord, and this operation affects considerably the production costs and times.

In order to obviate this drawback knotting stations have been developed that provide, when the stator gets out of the lacing station, to knot together the initial and final terminals of the cord. The addition of a station in the production line affects however considerably the costs of the plant and the maintenance costs and increases the probabilities of a machine stop due to failures on the production line.

U.S. Pat. No. 3,983,826 discloses a device that locks the starting lacing terminal of the cord and subsequently effects a knot on the end lacing terminal. The knot made by such device is however a rather complex knot that lengthens considerably the working cycle of each single piece.

U.S. Pat. No. 4,614,161 discloses a device that effects automatically the lacing of a stator coil, using a diamond stitch, and, at the end of the lacing phase, effects a knot on the end terminal of the cord. The effectiveness of the knot is assured by the melting of the free end of the cord (a cord made of polyester or other polymeric material), which is contemporaneously cut by means of an incandescent wire. Such device has however some drawbacks: the effectiveness of the knot is in fact strongly conditioned by the dimensions of the melted "little ball" formed during the cut, which can vary depending on many main factors (quality of the cord, temperature of the incandescent wire, etc.). Moreover, at each cut, a superfluous cord portion, known as "scrap", is produced which must be immediately removed and which represents an economical and ecological waste.

U.S. Pat. No. 4,558,894 discloses a device for tying or lacing a bundle of electrical wires in which, upon formation of a predetermined number of cord loops around the bundle, the lacing process is automatically stopped and a number of additional loops is laid in a chain-like formation on one side of the bundle. Once the desired number of additional loops has been laid, the cord is pulled tight to form a knot and is cut to allow starting a new lacing phase. Practical experience has shown that a knot made in such manner is not reliable and is prone to become readily untied.

SUMMARY OF THE INVENTION

A first object of the present invention is therefore to provide a method and a relative apparatus for effecting automatically both the lacing of a stator coil and the knotting of the end terminal of the cord, obviating to the drawbacks of the prior art devices.

Another object of the present invention is to provide a lacing apparatus that, at the end of the lacing cycle, effects automatically a very reliable self-locking knot on the end terminal of the cord, without generating scraps (unwanted cord portions).

In accordance with a first aspect of the invention, there is provided a method of knotting an end lacing terminal of a cord used for wrapping a generally toroidal coil of a dynamo-electric machine, by means of a lacing apparatus of the type comprising cord supply means, a lacing needle having a hook-shaped extremity and capable of rotating around its axis as well as of moving radially and axially relatively to said coil for engaging said cord and pulling it radially in order to form interlaced lacing rings wrapping said coil, and means for rotating said coil around its axis in synchronism with the movements of said needle, the method comprising the steps of:

forming, upon completion of a lacing phase, a plurality of knotting rings in a chain-like arrangement on said end lacing terminal, by making the cord pass each time through a previously formed knotting ring or through a last-formed lacing ring, respectively, when a first knotting ring is being formed; and cutting the last knotting ring of said plurality;

said forming step comprising, during the formation of each knotting ring, pulling the cord to such an extent that said last-formed lacing ring and respectively each knotting ring preceding a last knotting ring in the chain are individually closed on the knotting ring being formed, whereby a chain of knot lockups forming a self-locking knot is obtained.

In accordance with a second aspect of the invention, there is provided an apparatus for automatically lacing and knotting, by means of a cord, a generally toroidal coil of a dynamo-electric machine, said apparatus comprising a cord supply means, means for driving a lacing needle having a hook-shaped extremity, said driving means being capable of rotating said needle around its own axis and of moving it radially and axially relatively to said coil for engaging said cord and pulling it radially in order to form interlaced lacing rings wrapping said coil, and means for rotating said coil around its axis in synchronism with the movement of said needle, said needle driving means being operable, upon completion of a lacing phase, to form a plurality of a plurality of knotting rings in a chain-like arrangement on said end lacing terminal, by making the cord pass each time through a previously formed knotting ring or through a last-formed lacing ring, respectively, when a first knotting ring is being formed, wherein said needle driving means are arranged to pull the cord, during the formation of each knotting ring, to such an extent that said last-formed lacing ring and respectively each knotting ring preceding a last knotting ring in the chain are individually closed on the knotting ring being formed, whereby a chain of knot lockups forming a self-locking knot is obtained.

In accordance with a further aspect of the invention, there is provided a fastening system for an end lacing terminal of a cord used for lacing a generally toroidal coil of a dynamo-electric machine by means of a lacing apparatus of the type comprising cord supply means, a lacing needle having a hook-shaped extremity capable of rotating around its axis and of moving radially and axially relatively to said coil for engaging said cord and pulling it radially in order to form interlaced lacing rings wrapping said coil, and means for rotating said coil around its axis in synchronism with the movement of said needle, the system comprising a plurality of knotting rings in a chain-like arrangement on said end lacing terminal, a last-formed lacing ring and each knotting ring preceding a last knotting ring in the chain being individually closed into a knot lockup onto a first or respectively an immediately subsequent knotting ring, whereby the system comprises a chain of knot lockups forming a self-locking knot.

Thanks to the individual knot lockups formed whenever a knotting ring is being made, the resulting self-locking knot is very reliable and is not prone to become readily untied.

The lacing and knotting apparatus according to the invention shows better economic and simplicity characteristics than the prior art apparatus and allows, thanks to a cord cutting system that does not generate scraps, accelerating the production process and increasing reliability.

The aforesaid objects will become more apparent from the detailed description of embodiments of the method and apparatus according to the invention with particular reference to the attached Figures.

BRIEF DESCRIPTION OF THE DRAWINGS

FIGS. 11 and 12 show the hooking of the cord by means of a harpoon at the end of the knotting phase according to the method of the present invention;

DESCRIPTION OF PREFERRED EMBODIMENTS OF THE INVENTION

Figure 1:
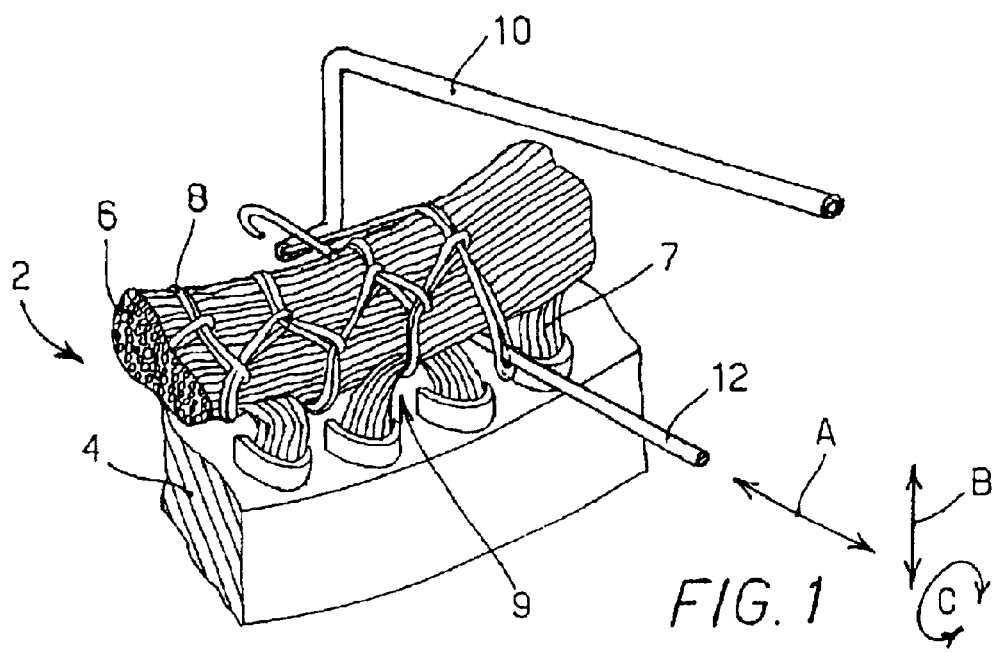
FIG. 1 is a perspective view of part of a stator during a conventional diamond stitch lacing process.

FIG. 1 shows part of a stator 2 of a dynamo-electric machine during a diamond-stitch lacing process. Particularly there are visible a toroidal metal core 4 and a copper wire coil 6, having circular shape, disposed over the core 4. A second coil, not shown in Figure, having shape and characteristics similar to the upper coil, is generally present under the core 4. The two coils are connected by means of wires 7 passing through the core 4. Between adjacent groups of wires 7 there are present some slots 9 which allow the passage of the needle 12 during the coil-lacing phase.

Being the upper and the lower coils very similar in shape and dimension, the automatic lacing machine is able to perform simultaneously, thanks to the symmetrical structure, the lacing of both the coils. Hereinafter, for clearness, the knotting operation of the upper coil only will be described, in that the operations performed by a possible second needle on a lower coil would be identical and perfectly specular.

The stator 2 is initially centered and fixed on a rotating base whose rotation is synchronized with the movements of a needle 12, having a hook-shaped end, and of a thread-guide tube 10. The rotation of the base is performed by angular divisions proportional to the number of slots in the coil (for a stator with 24 slots, for instance, the angle of rotation is equal to 15°).

The needle 12 is mounted on a needle support, not shown in FIG. 1 that allows it to effect various movements, a radial forward/backward movement, pointed out in FIG. 1 by the arrow A, an axial top/bottom movement, pointed out by the arrow B, and rotation movements around its axis clockwise or counterclockwise, see arrow C. The thread-guide tube 10 is mounted on a tube support which moves vertically and which can oscillate sideways to the right and to the left in order to follow the needle movements during the lacing operation. The aforesaid movements, reciprocally synchronized, could be obtained for instance by means of mechanical cam wheel oscillators and/or linkworks operated by a brushless electric motor driven by a dedicated control board.

At every lacing stitch the needle 12 advances with a radial movement into a slot 9, it hooks the cord 8 that comes from the tube 10, it withdraws passing the cord through a previously made lacing ring forming a new lacing ring, it moves upward with an axial movement, it advances again toward the inside of the coil for hooking again the cord and it finally withdraws forming another lacing ring. At this point, while the needle moves downward, the base rotates the stator of a position for allowing the needle to pass into next slot. The interlacing of the lacing rings originates a stitch known as the diamond or honeycomb stitch that winds and tightens the coil.

During the back movements the needle 12 effects a rotation about its own axis by approximately 180°, clockwise when the needle is in the lower position and counterclockwise when it is in the upper position. This expedient allows releasing the needle hook extremity from the previously made lacing ring during withdrawing.

Figure 2:
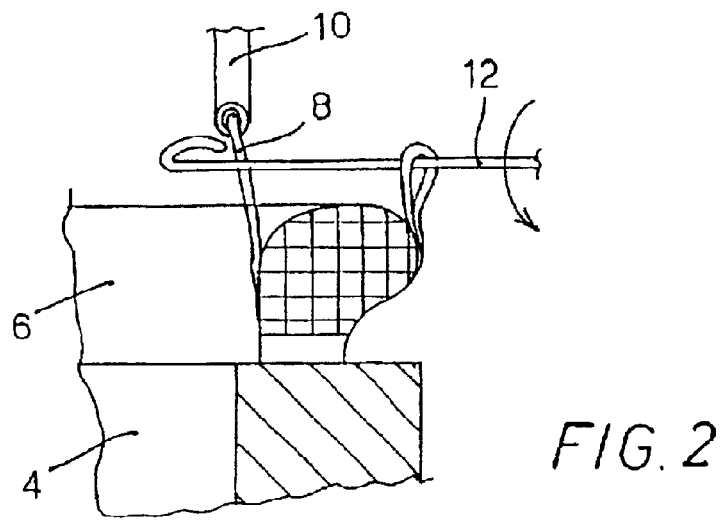
FIGS. 2 and 3 show the final phases of the lacing process.
Figure 3:
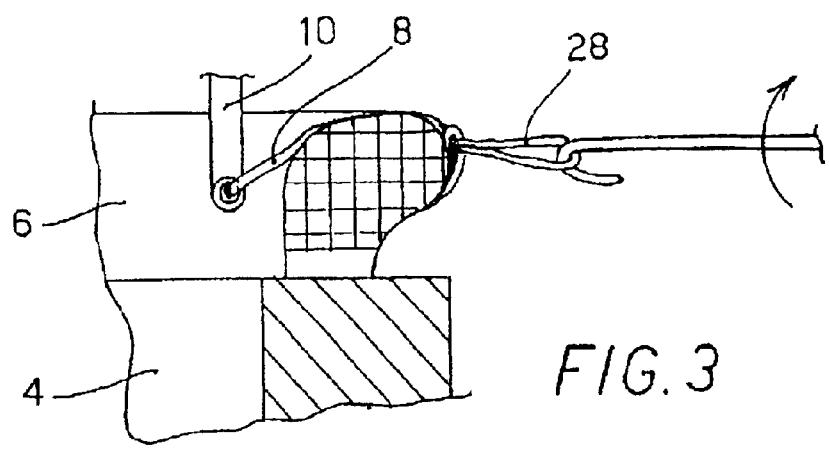

When the stator has effected a complete rotation and the lacing phase is terminated, the needle effects a last movement, shown in FIG. 2, from the inside toward the outside of the stator, effecting contemporaneously a 180° counterclockwise rotation, and starts to descend for reaching an intermediary position shown in FIG. 3.

Analogously the lacing phase could finish with a movement of the needle 12 from the inside toward the outside effected in the lower position, that is passing into a slot of the stator, returning then the needle in a position equivalent to the position shown in FIG. 3.

At this point the total kinematic mechanism of the machine stops, in the position shown in FIG. 3, with the hook of the needle 12 inserted in a last lacing ring 28, and starts the knotting phase. The lowering of the thread-guide tube 10, which during the lacing always accompanies the vertical movements of the needle 12, contributes to maintain tight the cord in this stopping phase.

The coming out of the cord 8 from the thread-guide tube 10 is controlled moreover by a cord friction and recovery system, not illustrated in all FIGS., that allows, when necessary, to restrain its exit or to withdraw the cord into the thread- guide tube 10.

When the kinematic mechanism of the machine has halted, it is necessary to separate the synchronism between the rotation of the base, on which the stator 2 is fixed, and the movements of needle 12 and thread-guide tube 10. In this way it is possible to stop the rotation of the base and to control independently the needle movement. Particularly, the rotation movement of the needle 12 is separated from the kinematic mechanism of the global lacing mechanics. The rotation of the needle, during the knotting phase, is controlled by an additional electric motor suitably controlled.

Figure 4:
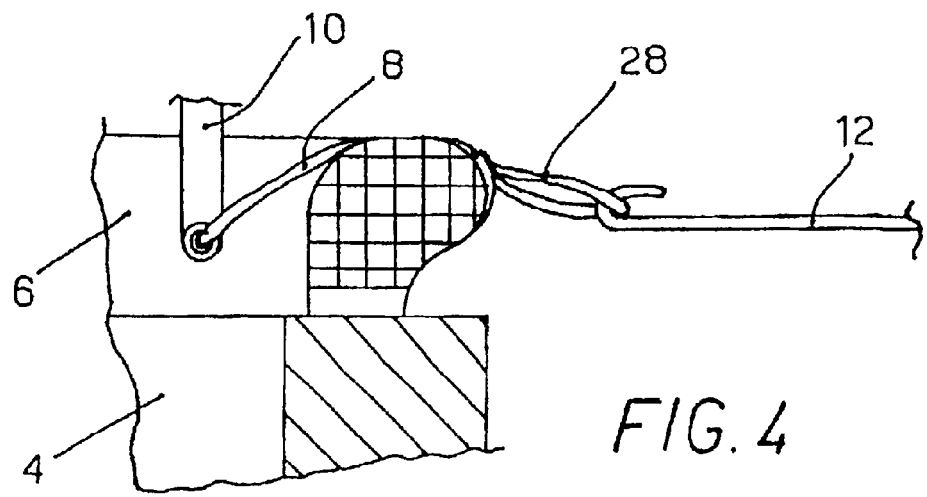
FIGS. 4 to 9 show the phases of a first knot lockup realized according to a first embodiment of the method of the present invention.
Figure 5:
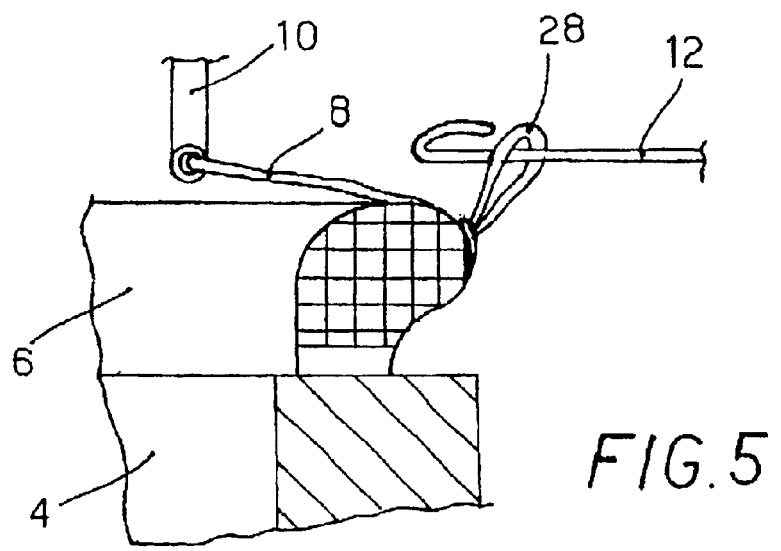

At this point the needle 12 is rotated about its own axis clockwise by 180°, turning upwardly the hook extremity and reaching the position shown in FIG. 4, then the sense of rotation of the kinematic mechanism of the machine is reversed moving up again the needle 12 and the thread-guide tube 10 and making the needle 12 advance radially toward the inside of the stator, see FIG. 5, passing in the last lacing ring 28, along a direction opposite to the direction of the last movement made by the needle for finishing the lacing phase.

In this phase the cord controlled recovery system intervenes and provides, withdrawing the exceeding portion of the cord into the thread-guide tube 10, to maintain tight the last lacing ring 28 on the needle 12.

Figure 6:
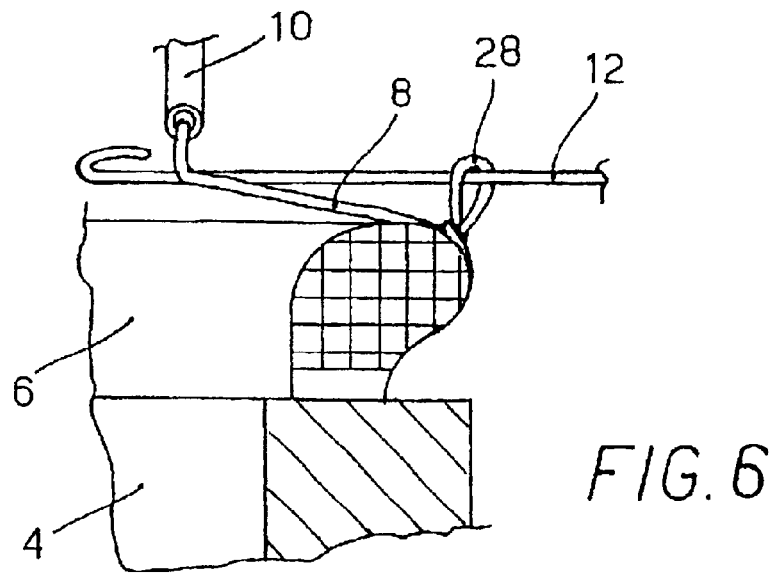
Figure 7:
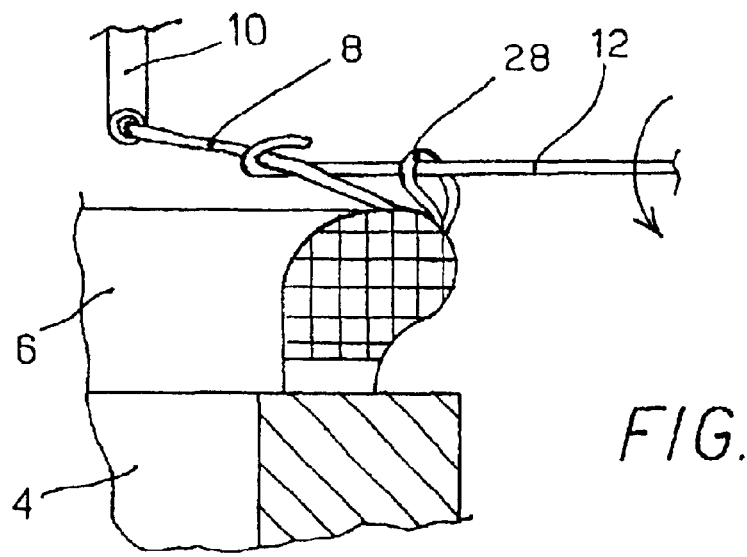
Figure 8:
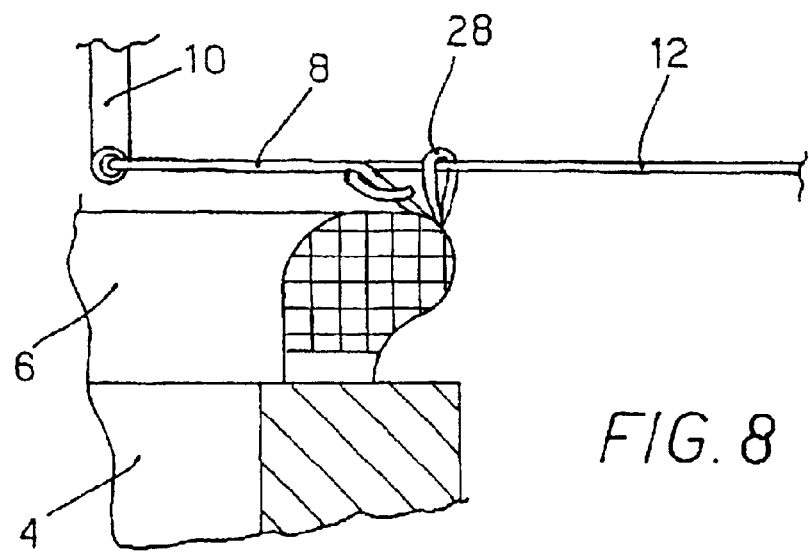
Figure 9:
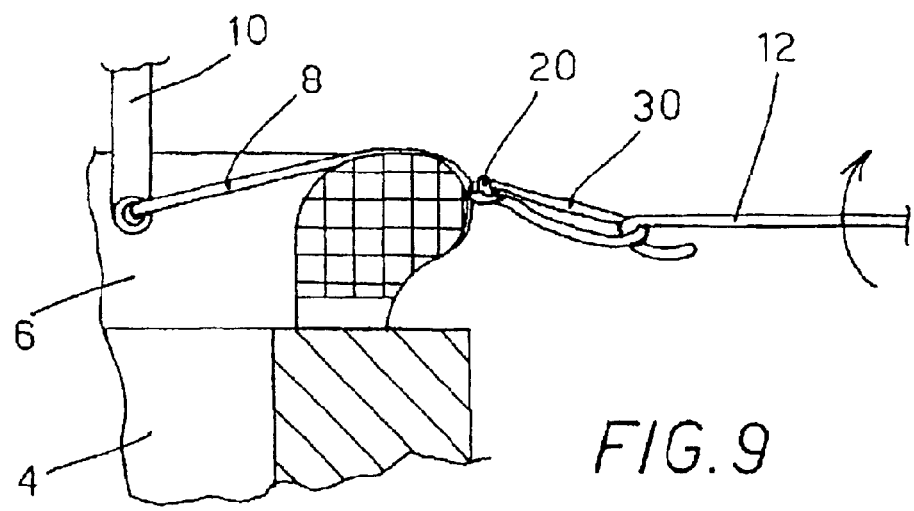

The advancement of the needle 12 towards the inside continues up to go beyond the cord 8 that exits from the thread-guide tube 10, see FIG. 6, then the needle retires hooking the cord, see FIG. 7, performs a 180° counterclockwise rotation for not hooking into the ring 28, see FIG. 8, and pulls the cord 8 into the ring 28 causing its closing and forming a first knotting ring 30, see FIG. 9.

In this phase the closing of the ring 28 is favored by the controlled intervention of the friction system that provides for stopping, or however braking, the exit of the cord 8 from the thread-guide tube 10.

The lacing ring 28 therefore has been closed on the cord ring 30 forming a first knot lockup 20. The needle 12 and the thread-guide tube 10 are returned in the initial knotting position previously shown in FIG. 3.

By operating the kinematic mechanism in reverse sense it is therefore possible to repeat the phases above described, and illustrated in FIGS. 3 to 9, in order to form a second knot lockup and, subsequently, a third knot lockup, getting a chain of knots 32 shown in FIGS. 10A and 10B. Experimentally it has been verified that the realization of three knot lockups represents an excellent compromise between knotting time and final characteristics. However it is possible to realize, using the same technique, a chain composed by only two knot lockups or by a desired higher number of knot lockups.

Figure 10A:
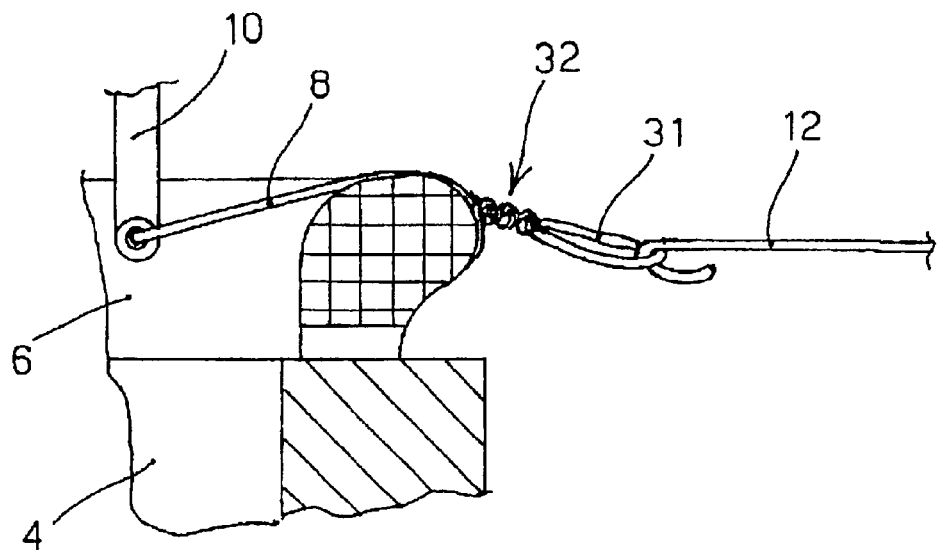
FIGS. 10A and 10B show three successive knot lockups realized according to the first embodiment of the method of the present invention.

FIG. 10A shows therefore the terminal phase of the realization of the last knot lockup, in this case the third, wherein the hook of the needle 12 is inserted in a last cord ring 31.

Figure 10B:
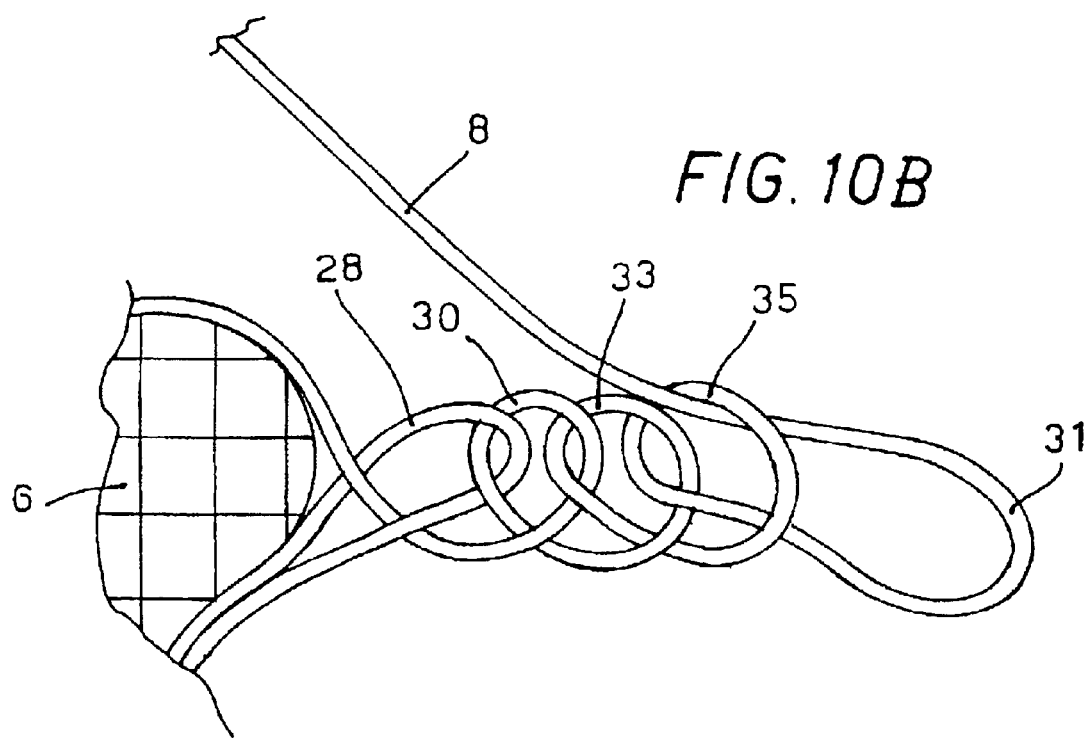

FIG. 10B shows schematically, in an open configuration, the chain, realized by means of the three knot lockups above described, formed by linkage of the last lacing ring 28 and the three following knotting rings 30, 33 and 35.

Once effected the last knot lockup, the needle 12 is rotated by 180° clockwise, the sense of the kinematic mechanism is again reversed, the needle 12 is passed into the ring 31 and moved to the position of total advancing, shown in FIG. 11. Subsequently a harpoon 14, coming from a side direction substantially perpendicular to the needle 12, passes under the needle and, once hooked the cord 8, retires withdrawing the cord and locking it contemporaneously by means of a lock 16, as visible in FIG. 12, for preparing the cord to the cutting phase.

Figure 13:
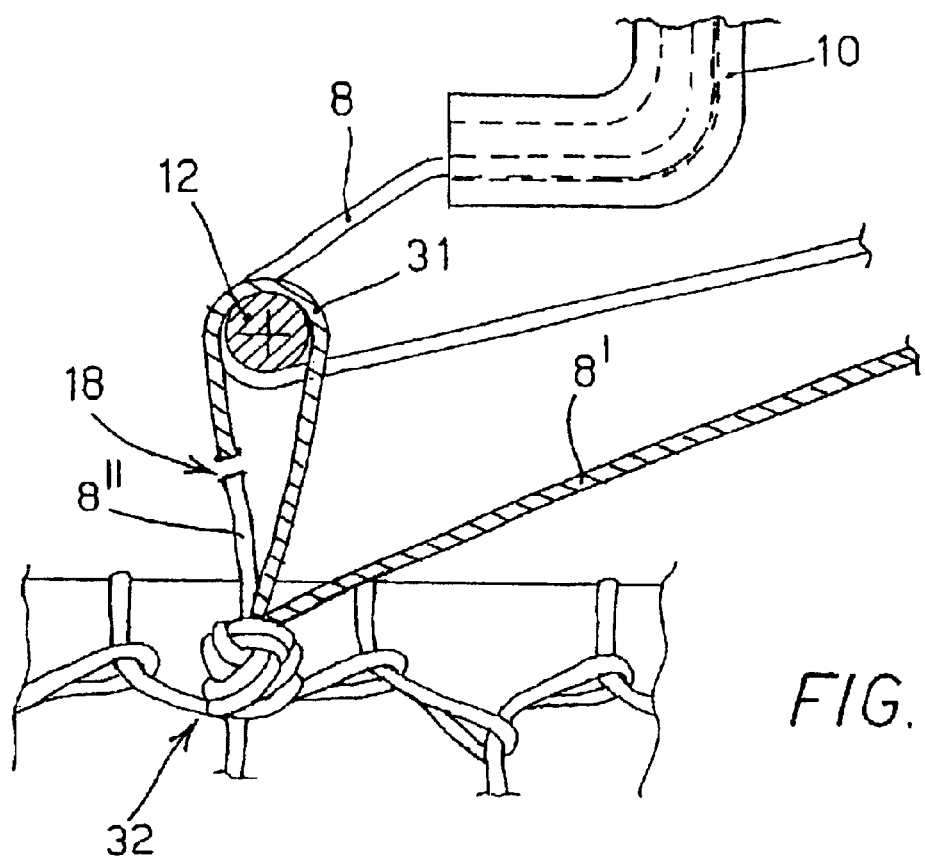
FIG. 13 shows the cord cutting phase at the end of the knotting phase realized according to the present invention.

FIG. 13 shows in detail the cutting phase of the cord 8 that finishes the knotting operation. The cord ring 31, passing around the needle 12, is pulled tight by the harpoon 14 in combination with the lock 16. By means of a sharp blade or an other cutting system, as for instance a wire made incandescent by the passage of electric current, it is possible to intervene sideways cutting, in the point 18, only one of the two half rings of cord pulled tight between the knot 32 and the needle 12. Drawing the cord 8 by means of the harpoon 14 it is therefore possible to extract the cord from the knot 32, releasing the extremity 8'. Only a short cord portion 81" remains attached to the self-locking knot 32.

Figure 14:
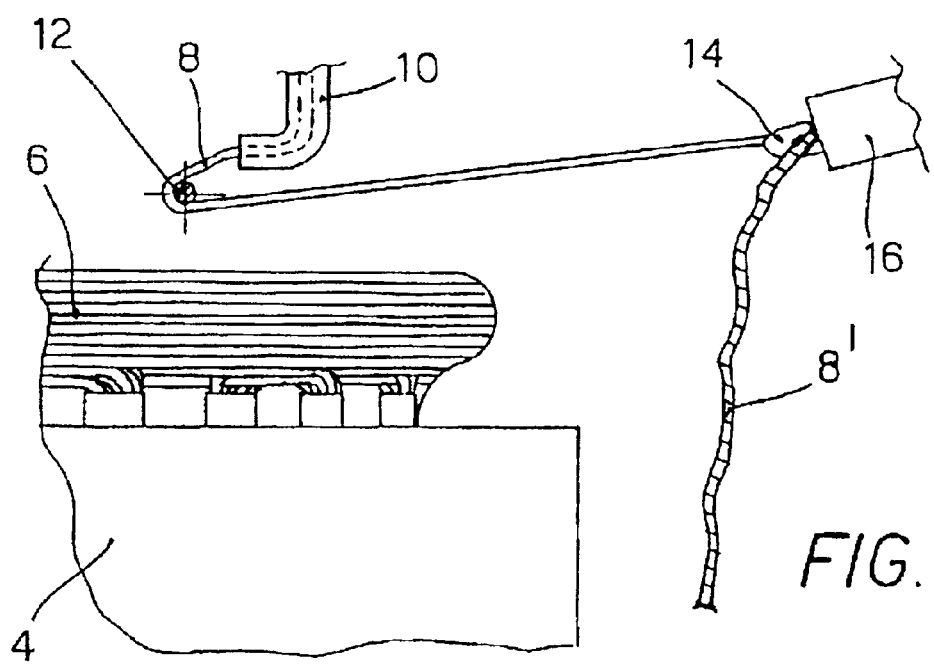
FIG. 14 shows the position of the cord before the beginning of a following lacing phase on a new stator coil.

Advantageously, if a rotating table, suitable for holding contemporaneously two stators, is used, once finished the knotting operation on one stator and cut the cord as described above, the rotation of the table itself provides for drawing the cord portion 8' from the knot 32, as shown in FIG. 14, without the need of another intervention of the harpoon 14.

Figure 15:
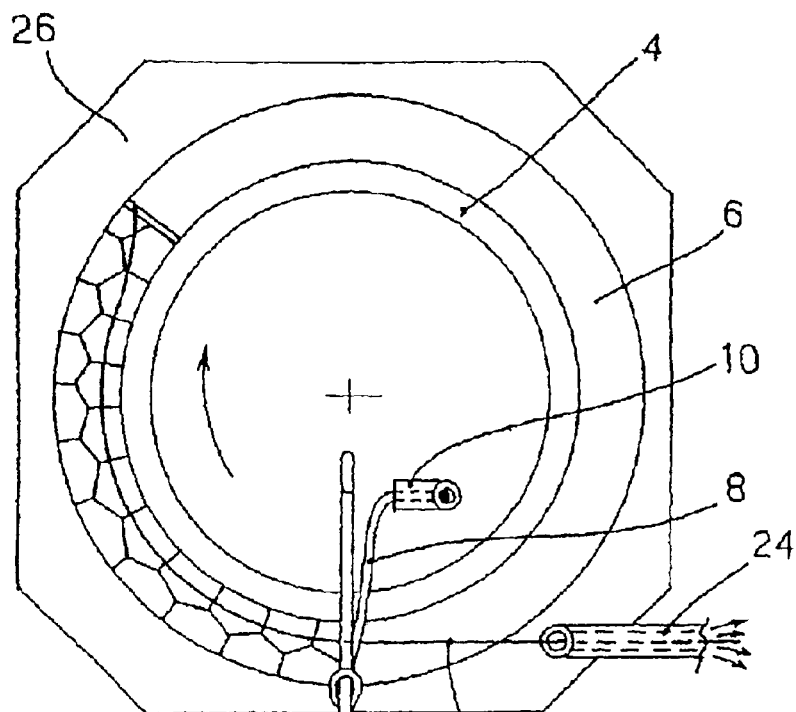
FIG. 15 shows an advanced lacing phase on a new stator coil.

The free cord extremity 8' can be sucked by a vacuum pipe 24, placed perpendicularly to the needle 12, shown in FIG. 15, where a new lacing operation, in an advanced phase, on another stator coil, is shown. As it is clearly visible in FIG. 15, the free cord portion 8' is automatically locked under the lacing, getting out of the vacuum pipe 24 as the stator is rotated clockwise.

The realization of this knot therefore does not generate scrap, or isolated cord portions, that otherwise should be immediately removed for not interfering with the mechanical moving parts of the machine itself.

In FIGS. 16 to 28 a second embodiment of the knotting method according to the present invention is illustrated.

Figure 16:
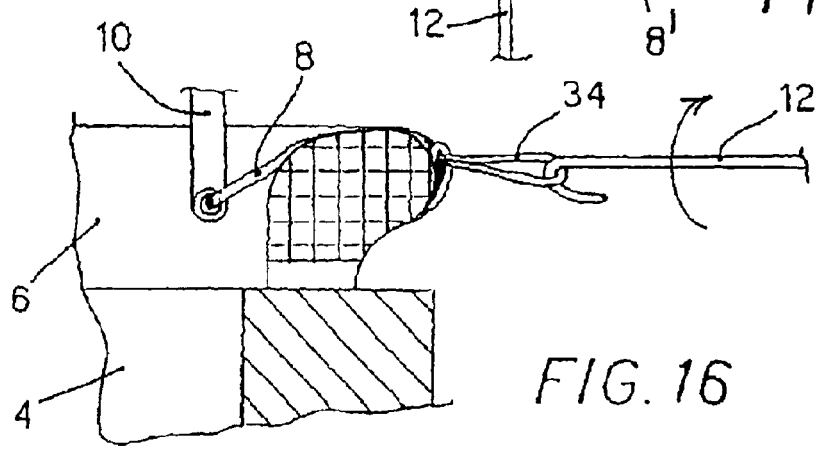
FIGS. 16 to 28 show the phases of a knotting process realized according to a second embodiment of the method of the present invention.

FIG. 16 shows the position of the needle 12 and of the thread-guide tube 10 when, terminated the lacing phase, the total kinematic mechanism of the machine stops for beginning the knotting phase. The configuration shown in FIG. 16 is equal to the starting configuration, previously shown in FIG. 3, of the first embodiment.

The hook of the needle 12, turned downwardly, is inserted in a last lacing ring 34, the needle 12 and the thread-guide tube 10 are slightly lowered and they maintain pulled tight the cord 8.

The coming out of the cord 8 from the thread-guide tube 10 is controlled moreover by a cord friction and recovery system, not illustrated in Figures, that allows, when necessary, to restrain its exit or to withdraw the cord into the thread-guide tube 10.

When the kinematic mechanism of the machine has halted, it is necessary to separate the synchronism between the rotation of the base, on which the stator 2 is fixed, and the movements of needle 12 and thread-guide tube 10, so that it is possible to stop the rotation of the base and to control independently the needle movement. Particularly the rotation movement of the needle 12 is separated from the kinematic mechanism of the global lacing mechanics. The rotation of the needle, during the knotting phase, is controlled by an additional electric motor suitably controlled.

Figure 17:
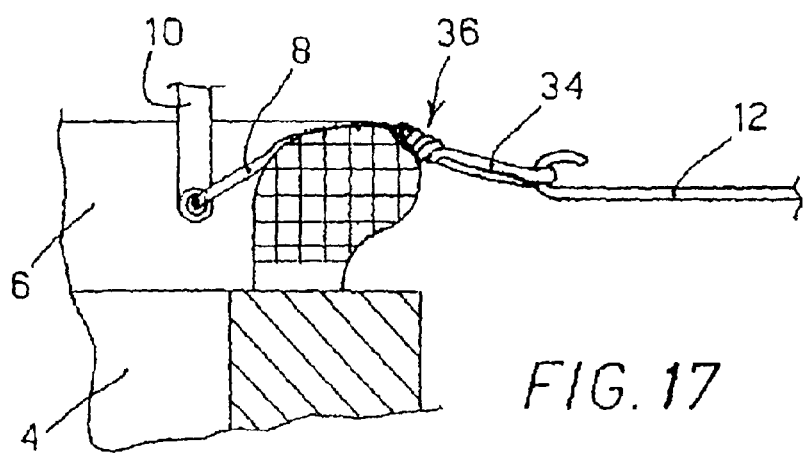

The next phase, shown in FIG. 17, provides for the rotation of the needle 12 on its own axis by about 540° clockwise in order to twist the lacing ring 34, generating a torsion or twist 36 in the cord, and turning up the hook extremity.

Figure 18:
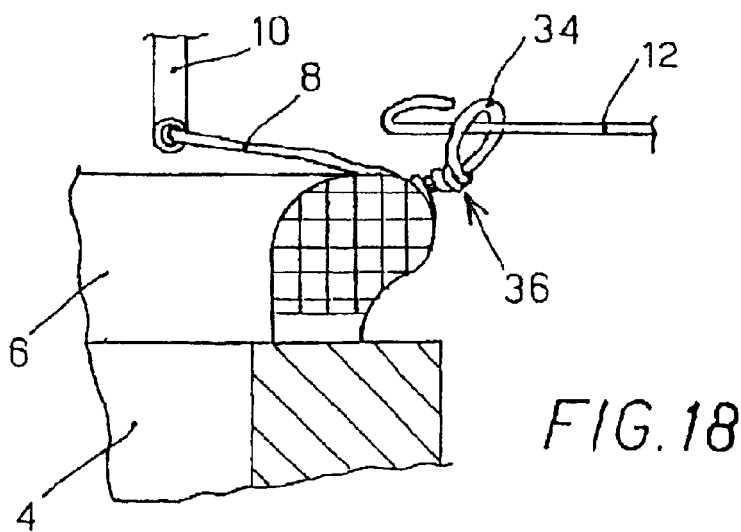

Successively the sense of rotation of the kinematic mechanism of the machine is reversed, moving up the needle 12 and the thread-guide tube 10 and making the needle 12 advance radially toward the inside of the stator, see FIG. 18, passing in the twisted lacing ring 34, along a direction opposite to the direction of the last movement made by the needle for finishing the lacing phase, in this case passing over the coil 6.

In this phase the cord controlled recovery system intervenes and provides, withdrawing the exceeding portion of the cord into the thread-guide tube 10, to maintain tight the twisted lacing ring 34 on the needle 12.

Figure 19:
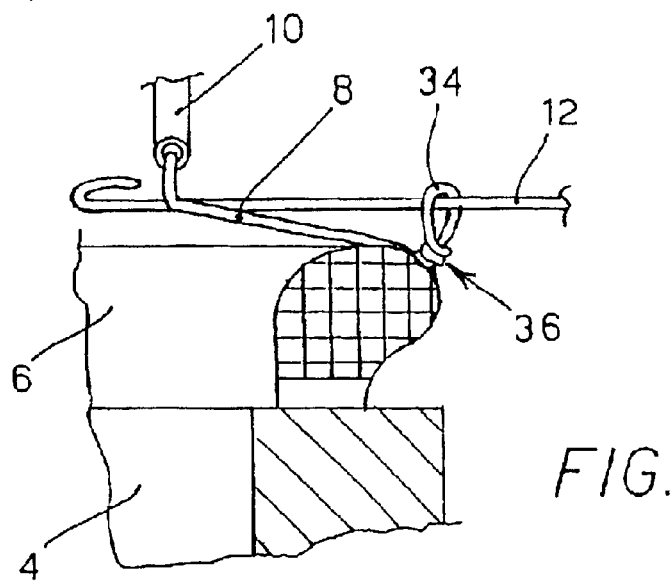
Figure 20:
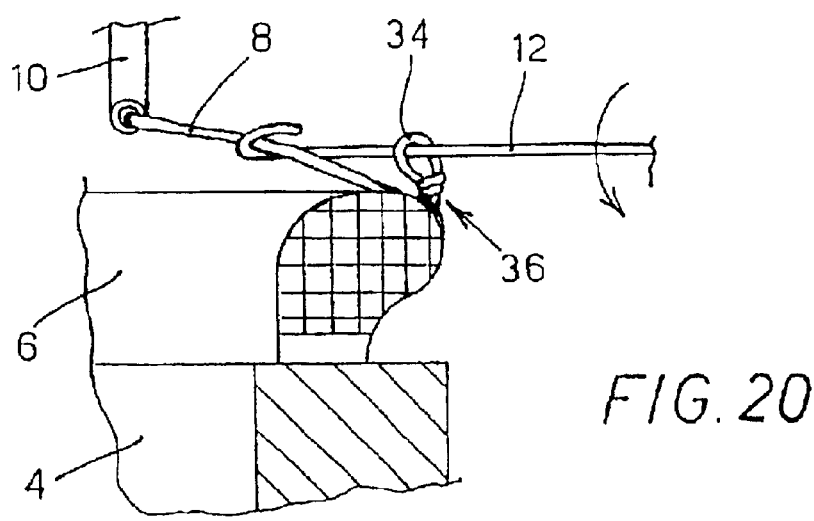
Figure 21:
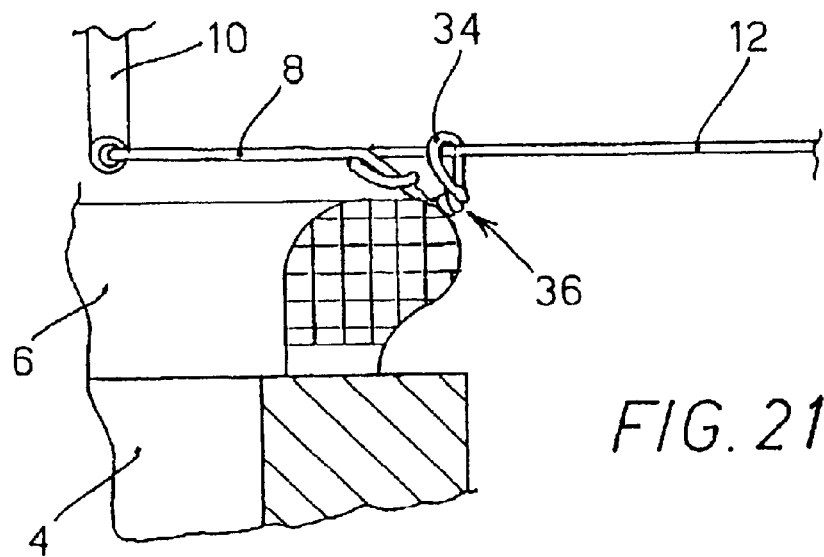

The advancement of the needle 12 towards the inside continues up to go beyond the cord 8 that exits from the thread-guide tube 10, see FIG. 19; then the needle retires hooking the cord, see FIG. 20, performs a 180° counterclockwise rotation for passing easily into the twisted ring 34, see FIG. 21, and pulls the cord 8 into the twisted ring 34 causing its closing and forming a first knot lockup 38 and a first knotting ring 39.

In this phase the closing of the twisted ring 34 is favored by the controlled intervention of the friction system that provides for stopping, or however braking, the exit of the cord 8 from the thread-guide tube 10.

Figure 22:
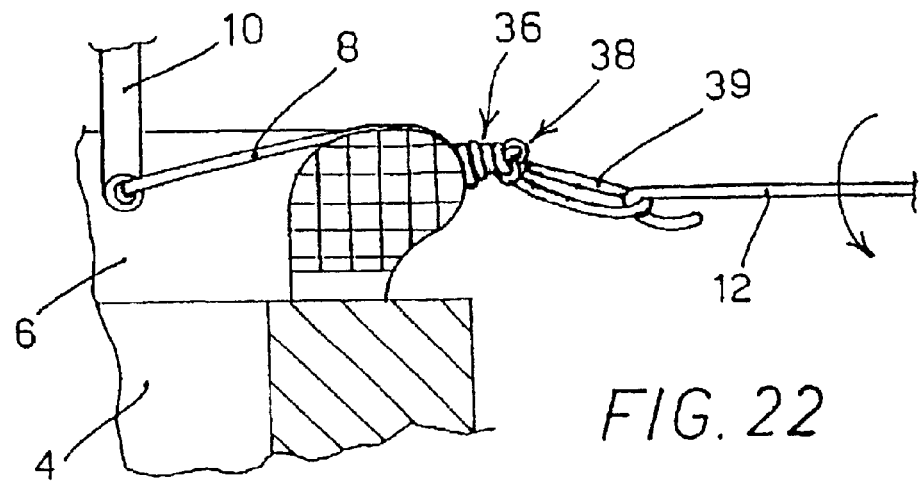

The twisted lacing ring 34 therefore has been closed on the cord ring 39, or knotting ring, forming a first knot lockup 38, as shown in FIG. 22. The needle 12 and the thread-guide tube 10 are returned in a position equivalent to the initial knotting position previously shown in FIG. 16.

Figure 23:
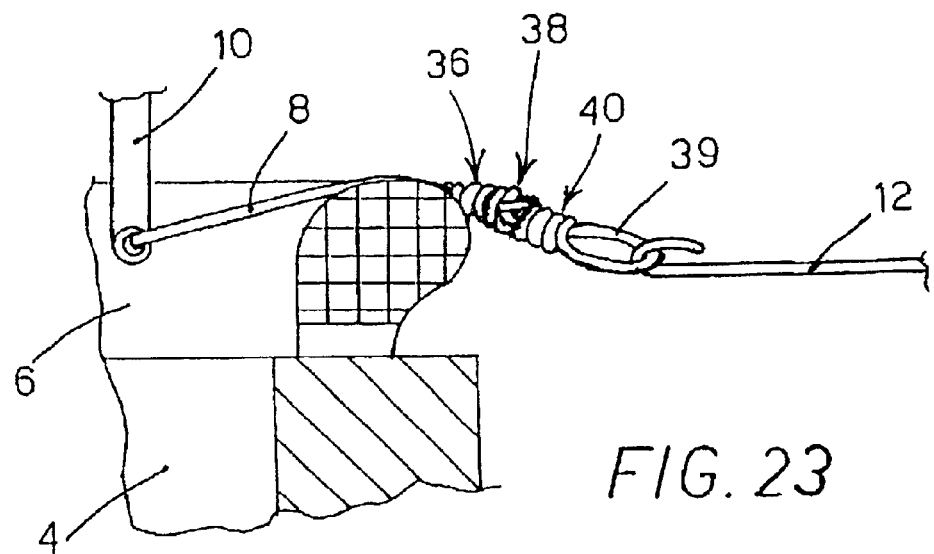

The next phase, shown in FIG. 23, provides for the rotation of the needle 12 about its own axis by about 540° counterclockwise in order to twist the lacing ring 39, generating a second torsion 40 in the cord, and to turn up the hook extremity.

Figure 24:
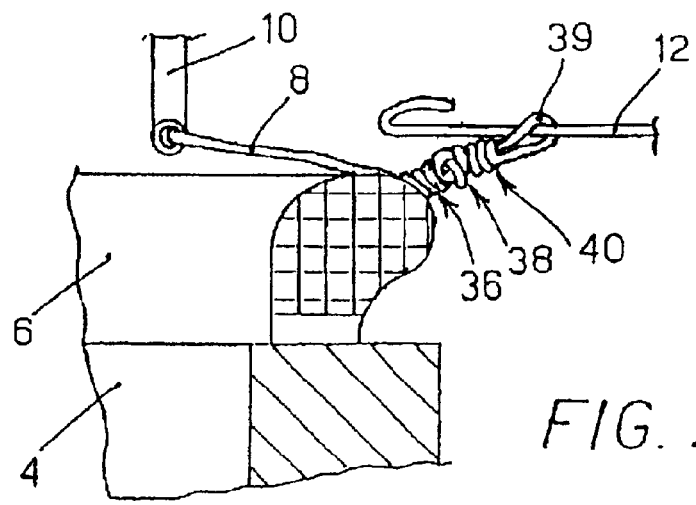

Reversing now the kinematic mechanism of the machine, the needle 12 and the thread-guide tube 10 are raised, and then the needle 12 moves radially toward the inside of the stator, see FIG. 24, passing in the twisted lacing ring 39.

Figure 25:
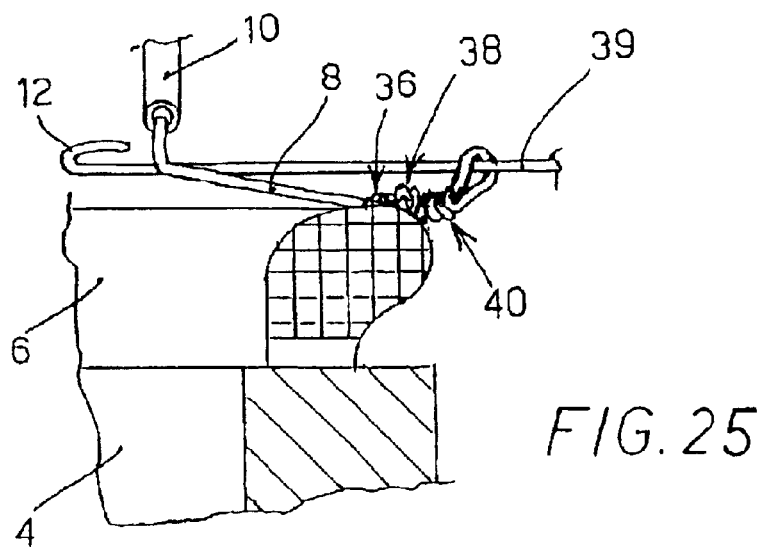
Figure 26:
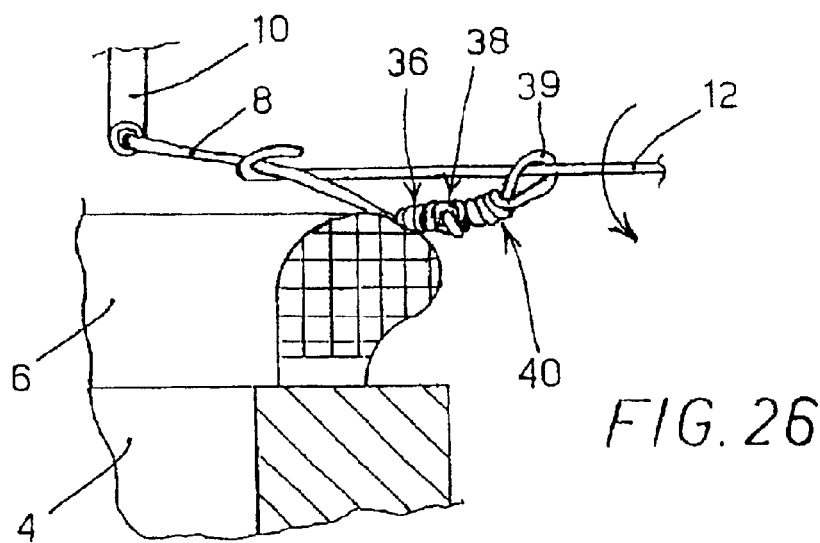
Figure 27:
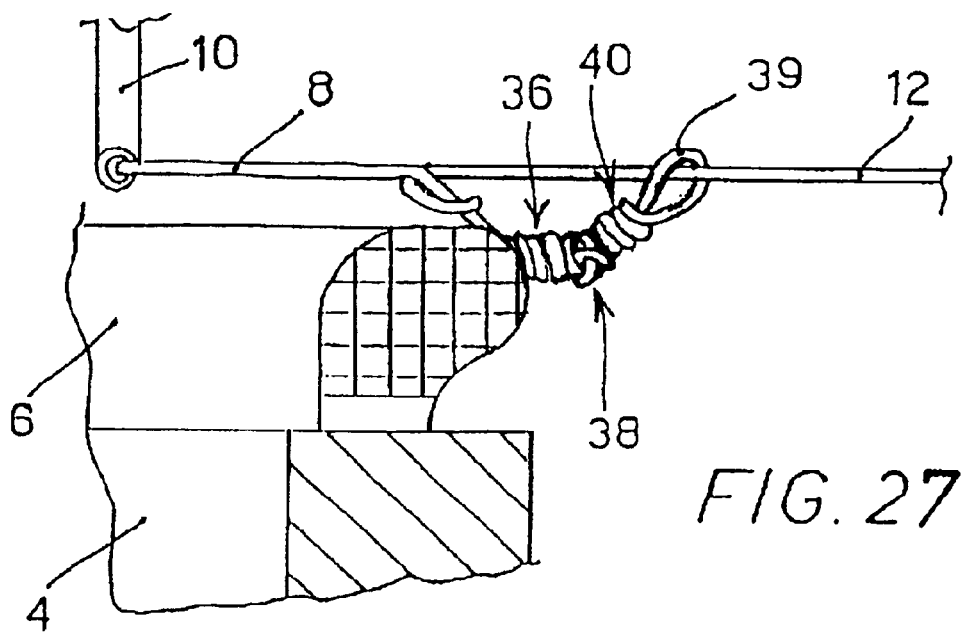

The advancement of the needle 12 towards the inside continues up to go beyond the cord 8 that exits from the thread-guide tube 10, see FIG. 25, then the needle retires hooking the cord, see FIG. 26, performs a 180° counterclockwise rotation for not hooking into the twisted ring 39, see FIG. 27, and pulls the cord 8 into the twisted ring 39 causing its closing and forming a second knot lockup 42 and a last knotting ring 44.

Figure 28:
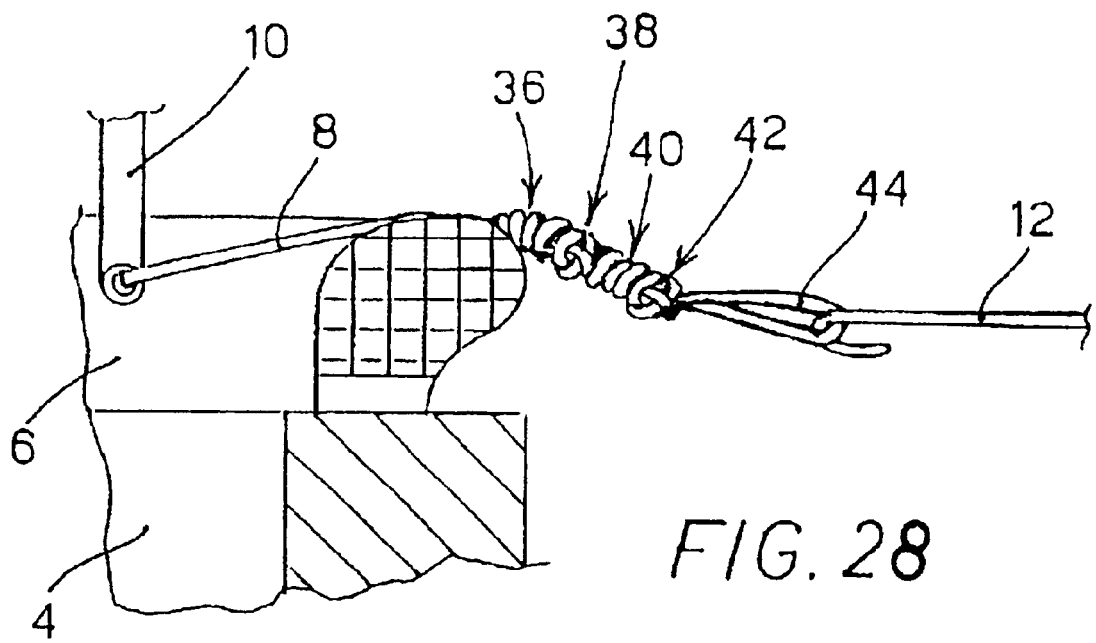

FIG. 28 shows, schematically, the succession of the first torsion 36, the first knot lockup 38, the second torsion 40 and the second knot lockup 42. In the real knot the sequence of these operations generates a small chain in which it is difficult to distinguish the twists and the knot lockups.

The torsion preceding each knot lockup contributes considerably to increase the tightness of the knot, allowing realizing, by means of only two knot lockups, a perfect self-locking knot.

Experimentally it has been verified that the realization of two twisted knot lockups represents an excellent compromise between knotting time and final tightness characteristics. However it is possible realize, using the same technique, a chain composed by only one twisted knot lockup, if a high tightness is not requested, or by a higher number of twisted knot lockups.

The direction of the 540° rotations performed by the needle 12 for realizing the first and the second twists in the cord is not a critical parameter for the realization of the knot. Said twists in fact can be realized indifferently clockwise or counterclockwise, in opposite directions or in the same direction. Moreover each rotation, which preferably is 540°, equal to a one and a half turn of the needle, could be for instance 900°, equal to two turns and half, or of any desired value greater than 180°.

For terminating the realization of the twisted self-locking knot the method provides, as previously illustrated in FIGS. 11 to 15 of the first embodiment, for the capture of the cord 8 by means of a harpoon 14, the cut of the last knotting ring obtained and for the subsequent withdrawing of the cord 8 from the knot.

What is claimed is:

1. A method of knotting an end lacing terminal of a cord used for wrapping a generally toroidal coil of a dynamo-electric machine, by means of a lacing apparatus of the type comprising cord supply means, a lacing needle having a hook-shaped extremity and capable of rotating around its axis as well as of moving radially and axially relatively to said coil for engaging said cord and pulling it radially in order to form interlaced lacing rings wrapping said coil, and means for rotating said coil around its axis in synchronism with the movements of said needle, the method comprising the steps of:

forming, upon completion of a lacing phase, a plurality of knotting rings in a chain-like arrangement on said end lacing terminal, by making the cord pass each time through a previously formed knotting ring or through a last-formed lacing ring, respectively, when a first knotting ring is being formed; and cutting the last knotting ring of said plurality;

wherein said knotting rings are formed through the steps of:

(a) once finished the lacing phase by means of a last radial movement of the needle from the inside of the coil toward the outside to form said last lacing ring, separating the synchronism between the rotation movement of the coil and the movement of the needle and stopping the rotation of said coil;

(b) driving the needle in a first radial movement toward the inside of the coil, along a path equivalent to the needle path during said last radial movement, but in opposite direction;

(c) hooking the cord, supplied by said cord supplying means, by means of the hook-shaped extremity of said needle;

(d) driving the needle with the cord engaged in its hook-shaped extremity in a first radial movement toward the outside of the coil, along a path equivalent to the needle path during said first radial movement toward the inside, but in opposite direction, pulling the cord into said last lacing ring, causing its closing into a first knot lockup and forming a first knotting ring;

(e) driving the needle in a second radial movement toward the inside of the coil, along a path equivalent to the needle path during said last radial movement, but in opposite direction;

(f) hooking the cord, supplied by said cord supplying means, by means of the hook-shaped extremity of said needle;

(g) driving the needle, with the cord engaged in its hook-shaped extremity, in a second radial movement toward the outside of the coil, along a path equivalent to the needle path during said second radial movement toward the inside, but in opposite direction, pulling the cord into said first knotting ring, causing its closing into a second knot lockup and forming a second knotting ring:

(h) in case, repeating a given number of times the steps from (e) to (a); and (i) executing a cut in the last knotting ring and pulling the cord for extracting the free extremity, obtaining consequently a chain of knot lockups forming a self-locking knot.

2. The method according to claim 1, wherein, before executing the cut in laid second knotting ring, the following steps are accomplished:

(a) driving the needle in a third radial movement toward the inside of the coil, along a path equivalent to the needle path during said last radial movement, but in opposite direction;

(b) hooking the cord, supplied by said cord supplying means, by means of the hook-shaped extremity of said needle; and (c) driving the needle, with the cord engaged in its hook-shaped extremity, in a third radial movement toward the outside of the coil, along a path equivalent to the needle path during said third radial movement toward the inside, but in opposite direction, pulling the cord into said second knotting ring, causing its closing into a third knot lockup and forming a third knotting ring.

3. The method according to claim 1, wherein, before executing the cut in said second knotting ring, the steps are repeatedly iterated in order to form a chain having a desired length.

4. The method according to claim 3, wherein the needle, after having hooked the cord, performs a rotation by about 180° around its axis, during the radial movement toward the outside of the coil, turning downwards its hook-shaped extremity.

5. The method according to claim 4, wherein the needle, after having done a radial movement toward the outside of the coil, performs a rotation of about 180° around its axis turning up again its hook-shaped extremity.

6. The method according claim 4, to wherein the needle, after having done a radial movement toward the outside of the coil, effects a first axial movement downwards, a rotation by about 180° around its axis, turning up again its hook-shaped extremity, and a second axial movement upwards in a direction opposite to said first axial movement.

7. A method of knotting an end lacing terminal of a cord used for wrapping a generally toroidal coil of a dynamo-electric machine, by means of a lacing apparatus of the type comprising cord supply means, a lacing needle having a hook-shaped extremity and capable of rotating around its axis as well as of moving radially and axially relatively to said coil for engaging said cord and pulling it radially in order to form interlaced lacing rings wrapping said coil, and means for rotating said coil around its axis in synchronism with the movements of said needle, the method comprising the steps of:

forming, upon completion of a lacing phase, a plurality of knotting rings in a chain-like arrangement on said end lacing terminal, by making the cord pass each time through a previously formed knotting ring or through a last-formed lacing ring, respectively, when a first knotting ring is being formed; and cutting the last knotting ring of said plurality;

wherein said knotting rings are formed through the steps of:

(a) once finished the lacing phase by means of a last radial movement of the needle from the inside of the coil toward the outside to form said last lacing ring, separating the synchronism between the rotation movement of the coil and the movement of the needle and stopping the rotation of said coil;

(b) driving the needle in a first rotation around its own axis, to form a first torsion in said last lacing ring and obtain a twisted last lacing ring;

(c) driving the needle in a first radial movement toward the inside of the coil, along a path equivalent to the needle path during said last radial movement, but in opposite direction;

(d) hooking the cord, supplied by said cord supplying means, by means of the hook-shaped extremity of said needle;

(e) driving the needle, with the cord engaged in its hook-shaped extremity, in a first radial movement toward the outside of the coil, along a path equivalent to the needle path during said first radial movement toward the inside, but in opposite directions pulling the cord into said twisted last lacing ring, causing its closing into a first knot lockup and forming a first knotting ring; (f) in case, repeating a given number of times the steps from (b) to (e); and (fg) executing a cut in the last knotting ring and pulling the cord for extracting the free extremity, obtaining consequently a chain of knot lockup forming a self-locking knot.

8. The method according to claim 7, wherein, before executing the cut in said last knotting ring, the following steps are accomplished:

(a) driving the needle in a second rotation around its own axis to form a second torsion in said first knotting ring and obtain a first twisted knotting ring;

(b) driving the needle in a second radial movement toward the inside of the coil, along a path equivalent to the needle path during said last radial movement but in opposite direction;

(c) hooking the cord, supplied by said cord supplying means, by means of the hook-shaped extremity of said needle; and (d) driving the needle, with the cord engaged in its hook-shaped extremity, in a second radial movement toward the outside of the coil, along a path equivalent to the needle path during said second radial movement toward the inside, but in opposite direction, pulling the cord into said first twisted knotting ring, causing its closing into a second knot lockup and forming a second knotting ring.

9. The method according claim 8, to wherein said first rotation is performed in a direction opposite to the direction of said second rotation.

10. The method according to claim 8, wherein said first and said second rotations are rotations by about 540°.

11. The method according to claim 7, wherein, before executing the cut in the last knotting ring, the steps are repeatedly iterated, in order to form a twisted ring chain having a desired length.

12. The method according to claim 7 or 8 or 11, wherein the needle, after having done one of said radial movements toward the outside of the coil, effects a first axial movement downwards and, after a rotation around its axis, effects a second axial movement upwards moving in the upper position.

13. The method according to claim 1 or 7, wherein, before executing the cut in the last knotting ring, the following steps are accomplished:

(a) driving the needle in a first radial movement toward the inside of the coil passing through the last knotting ring;

(b) hooking the cord by means of a harpoon that comes from a side direction substantially perpendicular to said needle, passes under the needle and, once hooked the cord, is retracted while locking the cord by means of a lock.

14. The method according to claim 13, wherein, when the cut in the last knotting ring has been performed, said coil is moved and replaced by a new coil to be laced, and the cord, locked by the harpoon by means of the lock, is automatically pulled and withdrawn from the self-locking knot.

15. The method according to claim 1 or 7, wherein said cut in the last is performed by means of a wire made incandescent by the passage of electric current.

16. The method according to claim 1 or 7, wherein, in the steps in which the needle is driven in a radial movement toward the inside of the coil, cord recovery means in said supply means are made to intervene for maintaining tight the cord on the needle, and, in the steps in which the needle is driven in a radial movement toward the outside of the coil, cord braking means are made to intervene to limit the cord delivery from said supply means.

* * * * *